(No Model.)
C. W. ROGERS.
BICYCLE SUPPORT.
No. 598,009. Patented Jan. 25, 1898.
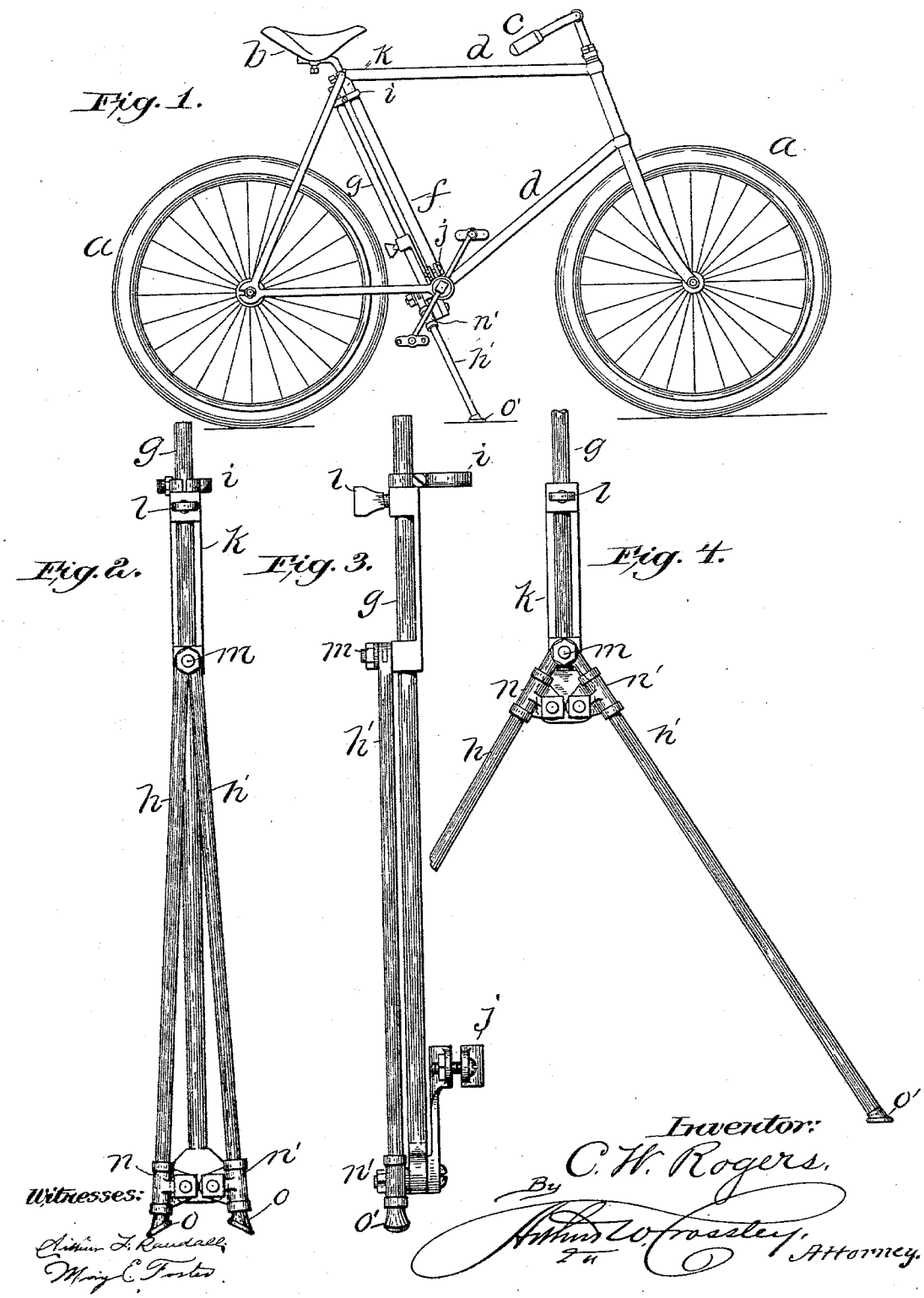
Witnesses:
Arthur F. Randall
Mary C. Foster
Inventor:
C. W. Rogers
By Arthur W. Crossley
Attorney

UNITED STATES PATENT OFFICE.

CHARLES W. ROGERS, OF NEW MARKET, NEW HAMPSHIRE.

BICYCLE-SUPPORT.

SPECIFICATION forming part of Letters Patent No. 598,009, dated January 25, 1898.

Application filed November 5, 1896. Serial No. 611,191. (No model.)

*To all whom it may concern:*

Be it known that I, CHARLES W. ROGERS, of New Market, in the county of Rockingham and State of New Hampshire, have invented certain new and useful Improvements in Bicycle-Supports, of which the following is a description sufficiently full, clear, and exact to enable those skilled in the art to which it appertains or with which it is most nearly connected to make and use the same.

This invention has relation to means adapted to be attached to a velocipede or bicycle and capable of adjustment thereon to sustain the "machine" in upright position when it is at a standstill.

It is the object of the invention to provide such improvements as will render a bicycle brace or support capable of attachment to the machine without adding materially to the weight thereof or at all marring its appearance, and which shall be adapted to be readily adjusted out of position when not wanted for use and to be easily and quickly lowered into and clamped in position when wanted for use, and which at the same time shall be serviceable in the highest degree and be simple of and economical in construction.

To these ends the invention consists of a bicycle brace or support comprising in its construction three principal members, consisting of rods or bars, one of which is adapted to be clamped upon one of the vertical rods of the bicycle-frame, and the other two of which are pivoted at their upper ends on a slide adapted to move and to be clamped upon the first-mentioned rod, the construction and arrangement being such that when the slide is raised the pivoted rods will be raised into parallelism with the first-mentioned rod, and when the slide is lowered the lower ends of the pivoted rods will be spread so that the said pivoted rods will extend at an angle to the first-mentioned rod, with their lower ends resting upon the ground or floor, and when held in this position, as they may be by clamping the slide in fixed place, they will support the bicycle in upright position, all as I will now proceed to describe in detail and then point out in the appended claims.

Reference is to be had to the annexed drawings, and to the letters marked thereon, forming a part of this specification, the same letters designating the same parts or features, as the case may be, wherever they occur.

Of the drawings, Figure 1 is a side view of a velocipede or bicycle equipped with my invention, showing the latter in the position in which it will be when it is adjusted to steady or brace the bicycle in upright position. Fig. 2 is a rear view, drawn to an enlarged scale, of the invention detached, showing the supporting rods or arms of the device as in raised position or when out of use. Fig. 3 is a side view of the invention as it is represented in Fig. 2. Fig. 4 is a rear view of the invention detached, showing it in the position in which it will be when adjusted so as to support the bicycle or velocipede in upright position, parts of the device being represented as broken off.

In the drawings, $a$ designates the wheels of a bicycle; $b$, the seat; $c$, the handle-bars, and $d$ the outline of the "diamond" frame.

$f$ is a vertical rod extending between the upper and lower bars of the frame to which my invention is attached.

The invention consists of three principal members or rods—namely, the vertical rod $g$ and two pivoted rods $h\ h'$. The rod $g$ is provided with clamps $i\ j$, by means of which it is clamped upon the vertical rod $f$ of the bicycle-frame, preferably in the rear of said rod $f$, as is indicated in Fig. 1.

$k$ designates a slide, which is adapted to move up and down on the rod $g$ and to be maintained in vertical position thereon.

$l$ is a thumb-screw, which is tapped through a part of the slide $k$ and is adapted to be keyed upon the rod $g$, so as to hold the slide $k$ in any position to which it may be moved.

The rods $h\ h'$ are pivoted at their upper ends at $m$ upon the slide $k$, so that their lower ends may swing to and fro. On the lower end of the rod $g$ there are pivoted sleeves $n$ $n'$, through which the rods $h\ h'$ extend, as is most clearly indicated in Fig. 2. Under this construction it will be seen that when the slide $k$ is drawn up and clamped in position the rods $h\ h'$ will be drawn up into parallelism with the rod $g$, but when the slide $k$ is lowered the lower or free ends of the rods $h$ $h'$ will be spread outwardly so as the rods will extend at an angle to each other, as is clearly illustrated in Fig. 4. It will be understood that the pivoted sleeves $n\ n'$ are fixed upon the lower end of the rod $g$ and that the rods $h\ h'$ are adapted to slide freely through the said pivoted sleeves.

In the use of my invention the rod $g$ will be secured to the vertical rod $f$ of the bicycle-frame by means of the clamps $i$ and $j$, which may be of the form shown or of any other suiting them, to be firmly clamped upon the rod $f$ and held in position thereon. The slide $k$ will be, as is already described, provided with a clamp whereby it may be clamped in any position upon the rod $g$, to which it may be moved by means of the thumb-screw $l$. Under this construction and arrangement of parts, when the invention is applied to a bicycle and the slide $k$ is clamped in its raised position, the rods $h\ h'$ will be held raised and in parallelism with the rod $g$ and with the vertical rod $f$ of the bicycle-frame and out of the way in the ordinary use of the machine. When, however, it is desired to maintain the bicycle in upright position, the thumb-screw will be loosened and the slide $k$ lowered so that the rods $h\ h'$, sliding through the pivoted sleeves $n\ n'$, will spread the said lowered ends of said rods, and when the lower or free ends of the same touch the ground they will act as braces or supports for the bicycle and maintain it in upright position, the slide $k$ being, of course, in its lowered position clamped upon the rod $g$. In this way, whether the user of the bicycle maintains his seat upon the saddle or leaves his "wheel" for the time being, the latter will be maintained and steadied in upright position, a thing very desirable under many circumstances and conditions, as is well known to the users of velocipedes or bicycles. If need be, the lower ends of the rods $h\ h'$ may be provided with feet $o\ o'$, so as to prevent the said rods from sinking into the ground or material upon which the bicycle may chance for the time being to stand.

It is obvious that changes may be made in various parts and features of my invention without departing from the nature or spirit thereof, the essential features of the improvement being the vertical rod, as the rod $g$, and slide adapted to move upon said rod and to be clamped thereon and the two bracing-rods pivoted at their upper ends upon the said slide and moving in pivoted sleeves or swivels at their lower ends.

Having thus explained the nature of the invention and described a way of constructing and using the same, though without attempting to set forth all of the forms in which it may be made or all of the modes of its use, it is declared that what is claimed is—

1. In a bicycle-support the combination of a rod, of a sleeve adapted to slide upon said rod, of means for clamping the sleeve to the rod, a pair of elongated sleeves pivotally connected with the lower part of said rod, a pair of rods or legs pivotally connected with the said sliding sleeve, each leg adapted to slide through one of the said pivoted sleeves, and means for fastening the rod to the frame of the bicycle.

2. In a bicycle-support, the combination of a rod having fastening-clamps thereon of a sliding sleeve on said rod, of a single pivot-pin carried by said sleeve, said pin being normal to the longitudinal axis of said rod, of a pair of sleeves pivotally connected with the lower end of said rod, of a pair of legs pivoted upon said pin and passing through the pivoted sleeves and adapted to slide therein, substantially as described.

In testimony whereof I have signed my name to this specification, in the presence of two subscribing witnesses, this 9th day of September, A. D. 1896.

CHARLES W. ROGERS.

Witnesses:
ARTHUR W. CROSSLEY,
C. C. CATE.